United States Patent
Ueda et al.

[11] Patent Number: 5,815,602
[45] Date of Patent: *Sep. 29, 1998

[54] DCT IMAGE COMPRESSION AND MOTION COMPENSATION USING THE HADAMARD TRANSFORM

[75] Inventors: Hideaki Ueda; Hirohisa Yamaguchi, both of Ibaraki, Japan

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 523,735

[22] Filed: Sep. 5, 1995

[30] Foreign Application Priority Data

Sep. 2, 1994 [JP] Japan .................................. 6-210061

[51] Int. Cl.⁶ .............................. G06K 9/36; G06K 9/46
[52] U.S. Cl. ......................... 382/236; 348/416; 348/699
[58] Field of Search ........................... 382/236; 348/394, 348/402, 407, 413, 416, 431, 699, 700; 386/111

[56] References Cited

U.S. PATENT DOCUMENTS

| | | | |
|---|---|---|---|
| 5,134,477 | 7/1992 | Knauer et al. | 348/416 |
| 5,475,430 | 12/1995 | Hamada et al. | 348/394 |
| 5,488,419 | 1/1996 | Hui et al. | 348/402 |
| 5,488,482 | 1/1996 | Ueda et al. | 386/111 |
| 5,581,302 | 12/1996 | Ran et al. | 348/416 |

*Primary Examiner*—Joseph Mancuso
*Assistant Examiner*—Timothy M. Johnson
*Attorney, Agent, or Firm*—Gerald E. Laws; William B. Kempler; Richard L. Donaldson

[57] ABSTRACT

The objective of this invention is to provide a data processor which can perform motion estimation of moving images at high speed and high accuracy. The data processor according to this invention is equipped with Hadamard transformer (110), first stage processor (120), second stage processor (130), and motion compensation circuit (140). The Hadamard transformer (110) receives image data (12) of the current frame and image data (34) of the reference frame, and Hadamard transforms this image data. First stage processor (120) block matches the target block with the Hadamard coefficient of the reference frame using multiple low-frequency coefficients selected from the Hadamard transformed data. Second stage processor (130) refers to the block matching position obtained in first stage processor (120), determines the search range in the picture data of the reference frame, and obtains the motion vector of the target block in said search range. Motion compensation circuit (140) outputs picture data which was motion compensated on the basis of the motion vector.

10 Claims, 5 Drawing Sheets

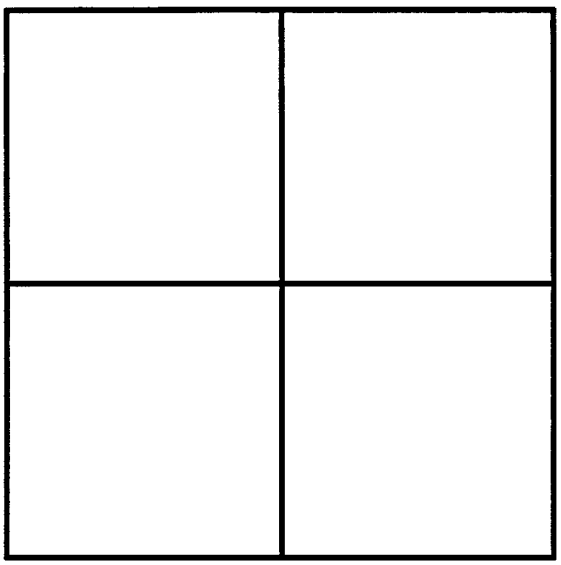
FIG. 4    FIG. 5
| NUMBER OF COEFFICIENTS USED | COEFFICIENTS USED | SPEED-UP FACTOR | UPPER LIMIT OF SPEED-UP FACTOR |
|---|---|---|---|
| 12(=3X4) | (0,0),(0,1),(1,0) | 18.3 | 21.3 |
| 20(=5X4) | (0,0),(0,1),(0,2),(1,0),(2,0) | 11.6 | 12.8 |
| 28(=7X4) | (0,0),(0,1),(0,2),(0,3),<br>(1,0),(2,0),(3,0) | 8.5 | 9.1 |
| 36(=9X4) | (0,0),(0,1),(0,2),(0,3),(0,4),<br>(1,0),(2,0),(3,0),(4,0) | 6.6 | 7.1 |
| 44(=11X4) | (0,0),(0,1),(0,2),(0,3),(0,4),(0,5),<br>(1,0),(2,0),(3,0),(4,0),(5,0) | 5.5 | 5.8 |
FIG. 6
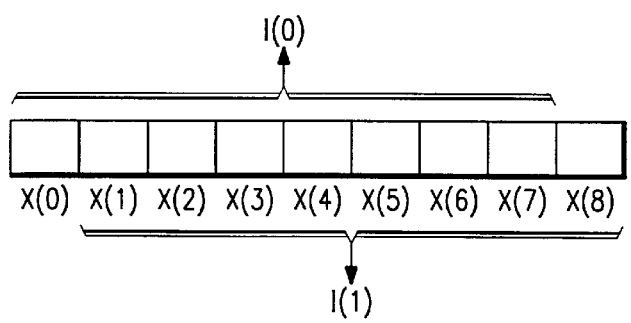
FIG. 9

DCT IMAGE COMPRESSION AND MOTION COMPENSATION USING THE HADAMARD TRANSFORM

FIELD OF THE INVENTION

The present invention concerns high-performance coding (data compression) of digital image data, and specifically, concerns motion estimation pertaining to moving images.

BACKGROUND OF THE INVENTION

Rapid progress in technologies concerning high-performance coding of digital image data (data compression) has occurred in recent years along with the development of technologies for semiconductor integration. This technology is indispensable in the storage and transmission of data for such applications as multimedia systems and digital HD TV that incorporate various types of data such as video and audio signals.

Image data in continuous field/film (moving images) consist of three-dimensional data in space and time. The redundancy of image data in the spatial components can be effectively reduced by means of a two-dimensional DCT (discrete cosine transform), whereas redundancy in the time components can be reduced by means of interframe/interfield predictive coding carried out by means of interframe or interfield coding, for example, motion compensation.

Interframe/interfield predictive coding by means of motion compensation does not involve simply coding the differences between the frames or fields, but rather involves information concerning the motion of the objects, specifically, the detection of the motion vector as the spatial change of objects between frames, and the coding of the differences in predicted values obtained on the basis of these motion vectors. Data compression is thereby made more effective.

There are two approaches for carrying out motion prediction, the pel-recursive algorithm and the block-matching algorithm (BMA). In general, the latter is more accurate than the former, and has become the MPEG standard.

A simple method for motion estimation algorithm by means of block matching is referred to as the full search method. Full search involves searching all of the locations within the search range and determining the motion vector from the minimum value of the total of the absolute differences between the images. The results of full search provide the most accurate vector pertaining to interframe differences. However, the implementation of full search is costly and time-consuming, and thus is not always practical for real-time hardware.

For this reason, research has developed pertaining to many types of high-speed motion-prediction algorithms. These algorithms can be classified into two groups based on the methods by which the computational complexity (amount of computation) is reduced. The first types are methods whereby the number of search locations is reduced in a stepwise approach. The other types are methods whereby the comparative computation is reduced, block-by-block, by using a separate standard rather than calculating the total of the absolute image differences, specifically, distortion measurement.

The former group includes 3-step hierarchical search (3SHS), two-dimensional logarithm search and parallel hierarchical one-dimensional search. In addition, the latter group includes feature-based block matching algorithms using integral projection techniques. The subsampling of the image uses a section of the image within the block, and this method also acts to decrease the calculation for each block-by-block comparison. In addition, improved results can be obtained by means of combining the technologies of these two groups. For example, there is an algorithm whereby integral projection is combined with 3-stage hierarchical search (3SHS).

In general, the method of the former group assumes that the distortion increases monotonically as the searched position moves further away from the best matched position. However, this is not always the case, and there are cases where the motion vector is trapped not at minimum values, but at sub-minimum values. In addition, there are cases where irregular data flow and complex control are disadvantageous in terms of hardware realization.

On the other hand, the methods of the latter group are comparatively easy to realize, and in addition, seem to have much more room for improvement than integral projection methods by using more appropriate transforms. In the past, investigations concerning more appropriate transforms regarding block matching motion-estimating algorithms had not yet been investigated. In order to reduce the computational complexity by this approach, it is necessary to express the main features of the block by means of a small number of transform coefficients, and these coefficients must be readily computed. If it were possible to search all of the positions with an extremely small number of computations, it would be possible to produce an algorithm that is extremely fast in comparison to full search algorithms. Moreover, search accuracy rivaling that of full searches could be achieved.

An objective of the present invention is to offer a data processing device and method for the same, whereby motion estimation of moving images can be carried out rapidly and with high precision.

Another objective of the present invention is to offer a data processing device and method of the same, whereby it is possible to carry out high-speed block matching by means of movement estimation based on an orthogonal transformation, for example, the Hadamard transform.

Another objective of the present invention is to offer a data processing method and a method for the same that is appropriate for use in systolic array architecture in digital image data processing.

Yet another objective of the present invention is to offer a data processing device, and method for the same, that is advantageous for use as a high-quality video encoder.

SUMMARY OF INVENTION

In order to solve the problems described above, the data processing device pertaining to the present invention has a transform means, whereby the first and second image data that constitute the first and second frames (or fields), respectively, are subjected to orthogonal transformation, for example, Hadamard transformation, and the transformed first and second transformed data are output; an estimation means connected to the aforementioned transform means, whereby the aforementioned first transformed data corresponding to the aforementioned image data are compared with the aforementioned second transformed data and the movement of the aforementioned first image data is estimated; and a means whereby the predicted values for the second image data are determined from the aforementioned estimation means, and the differences between the predicted values and the first image data are coded.

Preferably, the estimation means carries out block matching with the second transformed data using only a few coefficients (for example, low-frequency) selected from the first transformed data. In other words, by means of carrying out Hadamard transformation, most of the energy is concentrated in the low-frequency sections, and the main features of the block can be expressed by a few coefficients, thereby making it possible to reduce the time required for the matching process.

In addition, after motion estimation using the Hadamard coefficients, it is preferable for the estimation means to set the search domain within the second image data, and for the motion vector of the first image data to be detected in this search domain.

The data processing method pertaining to the present invention includes a step whereby the first and second image data that constitute the first and second frames or fields are subjected to Hadamard transformation, a step where the first transformed data corresponding to the aforementioned first image data are matched with the second transformed data corresponding to the aforementioned second image data, and the estimated data representing the optimal matching location are calculated, a step whereby the second image data that have been subjected to motion compensation based on the aforementioned motion estimation data are output and a step whereby the differences between the first image data and the aforementioned second image data that have been subjected to motion compensation are coded.

In order to determine the motion compensation data, it is preferable to include a step after matching of the first and second transformation data, whereby the search range for the second image data is specified based on the results of said matching, and the first image data are thus searched within this search range.

The present invention, as stated above, pertains to the implementation of high-speed block matching, and offers motion prediction based on the Hadamard transform. The Hadamard transform is an orthogonal transform similar to a discrete cosine transform (DCT), and DCT is thought to be one of the best transforms for use in image signal compression. The Hadamard transform can be calculated based only on the addition and subtraction of coefficients, and is advantageous because it functions by an extremely small number of computations in comparison to DCT. The algorithm of the present invention, as will be explained below, can decrease the number of computations by from $\frac{1}{5}$ to $\frac{1}{10}$ or less in comparison to full search algorithms with almost no decrease in search precision. When combined with other techniques, for example, adaptive indexing, the number of computations can be further decreased several orders of magnitude of parts. Regular data flow and simple control of the algorithm of the present invention provides excellent effects pertaining to hardware realization, particularly for systolic array processors.

BRIEF DESCRIPTION OF THE DRAWINGS

FIG. 4 shows a 16×16 block divided into four 8×8 blocks.

FIG. 5 shows each 8×8 block when Hadamard transform is applied.

FIG. 6 shows the relation between the Hadamard coefficients used and the algorithm speed-up factor.

FIG. 9 shows the computational method for the 1×8 subblock values.

FIG. 10 shows an example of the Hadamard transform coefficients used in simulation.

Figure 1:
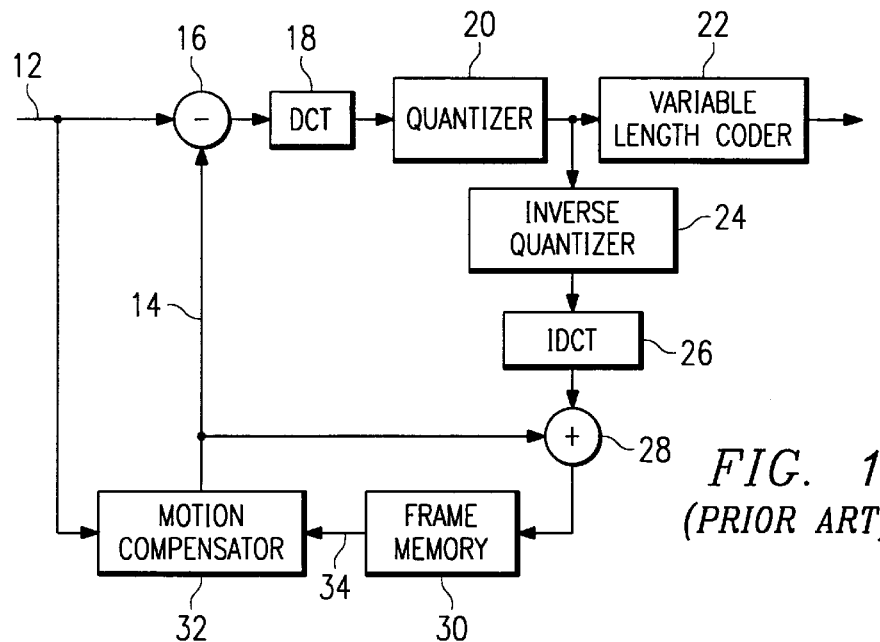
FIG. 1 is a block diagram showing the constitution of a conventional picture data coding circuit.

REFERENCE NUMERALS AND SYMBOLS AS SHOWN IN THE DRAWINGS (12), (34) . . . image data, (32) . . . motion compensator, (110) . . . Hadamard transformer, (120) . . . first stage processor, (130) . . . second stage processor, (140) . . . motion compensation circuit.

DESCRIPTION OF EMBODIMENTS

Preferred application examples of the present invention are explained below.

FIG. 1 is a block diagram that shows the structure of a common image data coding circuit. The differences between the digital image data 12 that constitute the current frame and the digital image data 14 of the reference frame that have been subjected to motion compensation are extracted with a subtractor 16 and are output to the discrete cosine transformer (DCT) 18. The data that have been subjected to transformation by the DCT is then quantized by the quantizer 20, and is then coded by the variable length coder 22 and is transmitted.

The quantized data are then supplied to the inverse quantizer, and after inverse quantizing, inverse DCT is carried out by the IDCT 26, and the resulting data are added to the image data 14 by the adder 28. The image data from the adder 28 are supplied to the frame memory 30, and are stored in the memory to be output as the image data of one frame prior (in some cases, reference is made to the previous or subsequent frame or-field). The motion compensator 32 receives the prior frame image data 34 from the frame memory 30 and the current frame image data 12, and the motion vector pertaining to the 16×16 pixel block in the current frame is determined. The image data 14 (predicted values) that have been subjected to motion compensation using this motion vector are then output to the subtractor 16.

Figure 2:
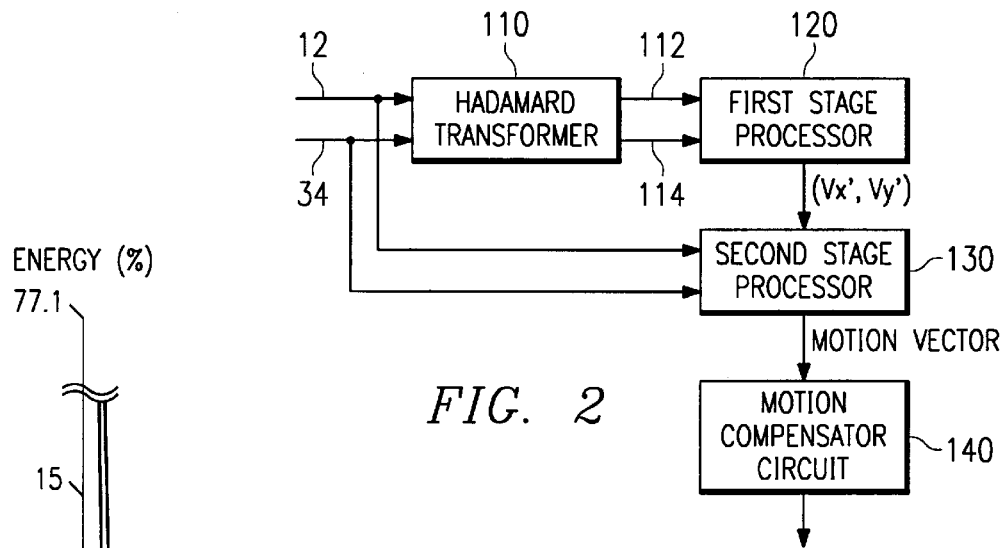
FIG. 2 is a block diagram showing the internal configuration of the motion compensation part in this application example.

The prediction algorithm used in this application example uses the Hadamard transform, and this aspect will now be explained. FIG. 2 is a block diagram of the internal structure of the motion compensator pertaining to this application example.

The motion compensator 32 has a Hadamard transformer 110 whereby the image data are subjected to Hadamard transformation, a first stage processor 120 connected to the Hadamard transformer 110, a second stage processor 130 connected to the first stage processor 120 that receives the image data for the current frame and the prior frame and a motion compensation circuit 140 connected to the second stage processor 130.

The Hadamard transformer 110 receives the image data 12 of the current frame (480×704) and the image data 34 of the prior frame (480×704) from the frame memory 30, and subjects the data to Hadamard transformation which is a type of orthogonal transformation. The Hadamard matrix consists of a transformation matrix with elements of +1 or −1, and thus is characterized by the fact that transformation can be carried out by only addition and subtraction (details are described below).

The first stage processor 120 receives the coefficient data 112 and 114 that have been transformed by means of the Hadamard transformer 110 and carries out block matching. The first stage processor 120 in this application example extracts the coefficient data of the 16×16 pixel block (referred to below as "target block") from the coefficient data 112 of the current frame, and in addition, extracts coefficient data from the search window in the horizontal direction (−64, +63) and the vertical direction (−16, +15) from the coefficient data 114 of the prior frame. Thus, the target block is subjected to block matching and the matching position is calculated.

The second stage processor 130 receives the matching position obtained from the first stage processor 120 and the search window in the image data of the prior frame is determined from the matching position, so that the motion vector is finally determined for the target block. At this point, the data transformed by the Hadamard transform has not yet been used, and processing has been carried out using image data similar to those used in common full-search methods.

The motion compensation circuit 140 supplies, to the subtractor 16 (FIG. 1), the predicted values obtained based on the motion vector determined by the second stage processor 130; specifically, the image data 14 that have been subjected to motion compensation.

1) The characteristics of the Hadamard transform, 2) a motion compensation algorithm based on the Hadamard transform, 3) the computation complexity of this algorithm and 4) the simulation results obtained using an MPEG test sequence are discussed in detail below.

[0027]
Characteristics of the Hadamard transform

The two-dimensional Hadamard transform for a block of image $X(i,j)$ ($0 \leq i, j \leq N-1$) is shown below.
Equation 1

$$[F(u, v)] = [T][X(i, j)][T]^t$$

Here, T denotes the Hadamard transform matrix, where a Hadamard transform matrix of order $N=2^n$ is defined by the following equation:
Equation 2

$$F(u,v) = \frac{1}{N} \sum_{i=0}^{N-1} \sum_{j=0}^{N-1} X(i,j) \cdot (-1)^{Lb(u,i)+b(v,j)}$$

where
Equation 3

$$b(k,l) = \sum_{m=0}^{n-1} k_m l_m$$

Terms $k_m$ and $l_m$ are respective bit states of the binary representation of k and l. The Hadamard transform matrix is a symmetrical matrix, so $[T]^t=[T]$. For the case of block-size 8×8, T can be expressed as follows:

Equation 4

$$T = \frac{1}{2\sqrt{2}} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

In this application example, a block size of 8×8 will be treated. Incidentally, notice that Equation 4 is a sequence-ordered Hadamard transform matrix, whereas Equation 2 is the definition of a natural-type Hadamard transform. These two Hadamard transforms are similar transforms having the same set of basis functions, but they differ in the sequence of these base functions. Thus, the transform coefficients are arranged in different sequences. In the explanation to follow, any description of the elements of the Hadamard transform coefficients, for example, a description concerning (0,2) element, will correspond to the definition of Equation 4.

In addition, in order to analyze the power spectrum, Equation 1 can be expressed as follows:
Equation 5

$$[f(w)] = [T'][x(z)]$$

where $[f(w)]^t = [F_{00} \ldots F_{77}]$, $[x(z)]^t = [x_{00} \ldots x_{77}]$, and $[T']$ is a 64×64 Hadamard transform matrix derived from Equation 2.

The covariance is defined as follows:
Equation 6

$$\begin{aligned}(E(ff')) &= (T)(E(xx'))(T)^t \\ &= (T)(R)(T)^t\end{aligned}$$

In the formula, E( ) denotes the expected values based on statistical calculation and R is the covariance matrix in the pixel domain. The left side of Equation 6 is defined as the power spectrum of the Hadamard transform domain. Details concerning the matrix R are determined by the features of the image signal and the statistical image model. If the matrix R is designed according to a separate Markov process, assuming the simplest case where the correlation coefficient is represented as ρ, the matrix R is expressed as follows:
Formula 7

$$R(i,j) = \rho^{\left|\frac{i}{N} - \frac{j}{N}\right|} |i+l|_{modN-jmodN}|$$

Where i and j denote the matrix coordinates and N denotes the block size (=8).

Figure 3:
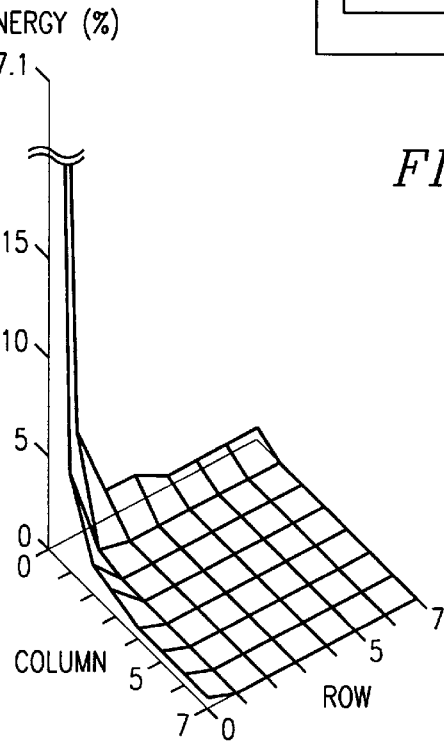
FIG. 3 shows the power spectrum in the Hamadard transform domain when the correlation coefficient $\rho=0.95$.

The elements on the diagonal of $[E(ff')]$ represent the average power provided to each of the Hadamard transform coefficients pertaining to the input pixel signal. FIG. 3 shows the power spectrum in the Hadamard transform domain calculated for cases where the correlation coefficient ρ=0.95. As is clear from this figure, the energy is concentrated in the low-frequency Hadamard transform coefficients. For example, 77% of the signal energy is concentrated in the (0,0) coefficient (DC element) and 91% is concentrated in the five low-frequency elements (0,0), (0,1), (0,2), (1,0) and (2,0).

2) Motion prediction algorithm based on Hadamard transform

As described above, the Hadamard transform concentrates most of the features of the signal block in a few low-frequency coefficients. In other words, the essential features of the block can be expressed by a very small number of coefficients. In short, this means that motion estimation can be realized using the low-frequency coefficients within a Hadamard transform domain. The reduction in computational complexity can thus be achieved because few computations are required for each block-by-block comparison.

The Hadamard transform matrix in this application example is composed of 8 rows and 8 columns. Consequently, a 16×16 target block, as shown in FIG. 4, is partitioned into four 8×8 blocks so that each block, as shown in FIG. 5, is subjected to Hadamard transformed (the marks "0" represents selected examples of low-frequency coefficients).

Thus, the first stage processor 120 carries out block matching by means of comparing the coefficient data between the specific search window in the prior frame and the 16×16 target block taken from the coefficient data 112. Only the low-frequency coefficients of the target block coefficients are subjected to matching, and thus the aforementioned five elements (0,0), (0,1), (0,2), (1,0) and (2,0) are used (elements marked in FIG. 5). The decision as to which of the low-frequency elements are to be used in matching of the target block must be predetermined. In this manner, the matching location ($V'_x$, $V'_y$) having minimum distortion in the 8×8 block is found by using the sum of the absolute errors of the low-frequency Hadamard transform coefficients.

This distortion function can be written as:
Equation 8

$$D(V_x, V_y) = \sum_u \sum_v |F_{t,0,0}(u,v) - F_{t-1,V_x,V_y}(u,v)|$$

where
Equation 9

$$[F_{t,V'_x,V'_y}(u,v)] = [T][X_t(i - V_x, j - V_y)][T]^t$$

The matching location of the 16×16 target block is defined as the sum of distortions D pertaining to the four 8×8 blocks that are determined according to Equation 8. Thus, the matching location can be found by computing only a small number of combinations corresponding to the selected low-frequency elements.

Normally, near-best matching can be achieved as a result of the processing carried out in the first stage. In the first stage, however, because only the low-frequency coefficients are considered, slight mismatching cannot be avoided between the best match position and ($V'_x$, $V'_y$). For this reason, a localized full search is carried out in the second stage. The full search is a method wherein the minimum of the total of the absolute errors between pixels is determined.

The second processor 130 receives the image data 12 and 34 of the prior frame and the current frame and the matching location ($V'_x$, $V'_y$) determined by the first stage processor 120, and a full search is carried out in the vicinity of said matching location. The search domain is vertically and horizontally (−2, +2) in the vicinity of ($V'_x$, $V'_y$). In short, motion prediction is made additionally precise by carrying out precision matching of the pixels (in some cases, half-pixels).

In this manner, the motion vector of the target block is determined from the final matching. The motion compensation circuit 140 receives the motion vector from the second stage processor 130, and the image data 14 of the prior frame that have been subjected to motion compensation are output.

(3) Computational complexity of algorithm related to this application example

In the algorithm according to this application example, a series of additions and subtractions must be performed. Division by 2√2, shown in Equation 4, is unnecessary, because the same motion vectors can be obtained without the 2√2 division. The full search also requires a series of additions and subtractions. Therefore, it is possible to consider the number of additions and subtractions as the computational complexity of the algorithm when compared to the conventional full search.

The computational complexity of the algorithm is obtained below, corresponding to the following simulation conditions: picture size of 480×704; block size of 16×16; search range (−16, +15) in the vertical direction and (−64, +63) in the horizontal direction, one pixel accuracy (integer search only).

FIG. 6 summarizes the relationship between the speed-up factor of the algorithm and the number of coefficients used. Here, if three low frequency coefficients are used in the first stage, are (0,0), (0,1), and (1,0) for the 8×8 block, 12 (=3×4) coefficients are used for the entire block size of 16×16. The speed-up factor indicates the time ratio when full search of the same full search range is considered as "1," and for example, if it is "18.3," it means a processing time of 1/18.3 for a full search. The upper limit of the speed-up factor is 256 divided by the number of coefficients used, and if the number of coefficients used is "12," the result is 21.3, and which means that the processing time of 1/21.3 for the full search is the upper limit. Namely, the speed-up factor takes an adjustment for the time used for computations other than the time required during the first stage of processing based on the upper limit factor, for example, computation of the Hadamard coefficients, second stage processing, and other processings.

In the algorithm of this application example in which only several low-frequency coefficients are used in all cases the coefficients are computed effectively by preprocessing, and the computational complexity is mainly determined by the number of Hadamard transform coefficients to be counted by Equation 8. The overhead computation for the selected Hadamard transform coefficient and neighborhood full search is rather small, as discussed later.

In the explanation below, the computational complexity (amount of computations) is obtained for the example of 5 coefficients, (0,0), (0, 1), (0, 2), (1, 0), and (2, 0), selected in the first stage. In addition, even when other coefficients are used, they are computed with the same method.

First, in the algorithm of this application example, it is necessary to understand that the same Hadamard transform coefficients are used repeatedly. This is due to the following two reasons.

(1) Search range for one block and for other blocks overlap each other. A pixel in a reference frame takes up 27 blocks at most and remains withing the search ranges.

2) The 16×16 block is divided into [four] 8×8 blocks. Therefore, an 8×8 block in the search range is used for 4 matching positions at most.

Therefore, it is preferable that all of the required Hadamard transform coefficients should be preprocessed for all of the 8×8 blocks. There are a total of 473×697 of 8×8 blocks in the reference frame.

Figure 7:
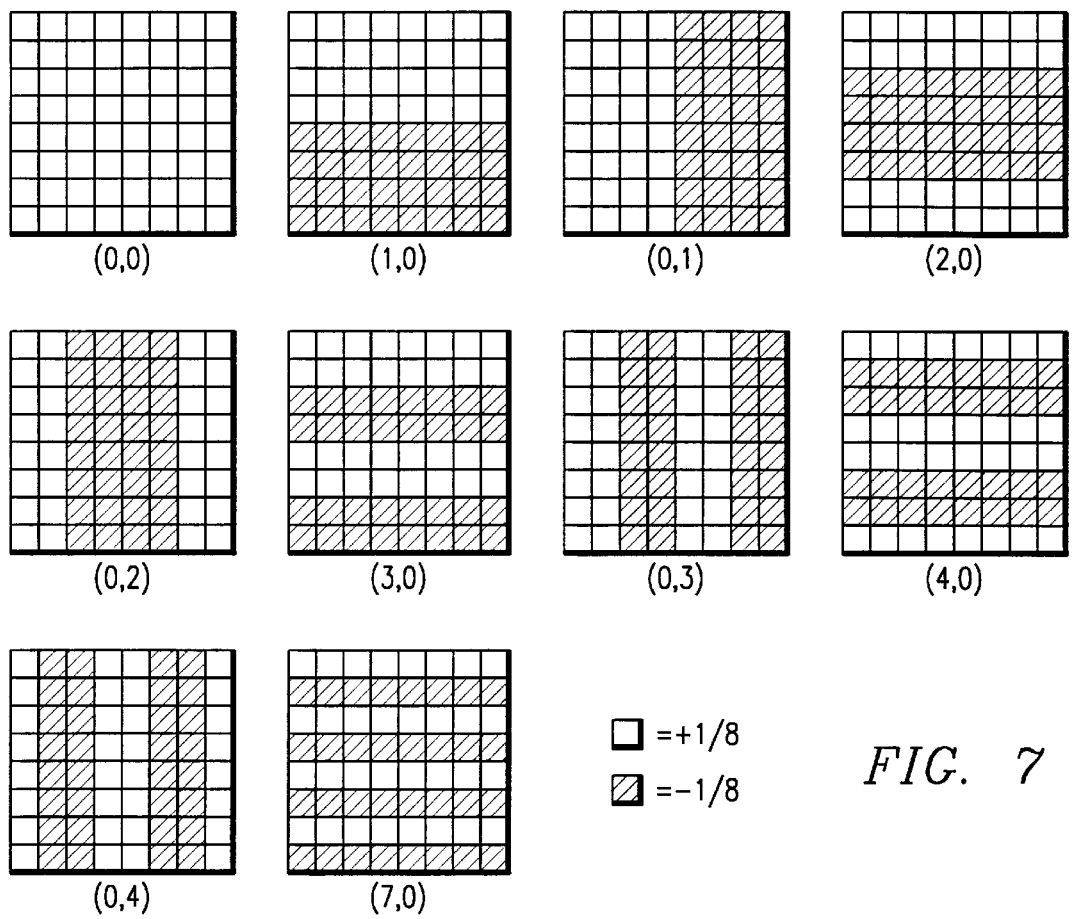
FIG. 7 shows a part of the basis functions of the 8×8 Hadarmard transform.

Next, a rational method for obtaining Hadamard transform coefficients will be explained. FIG. 7 shows a part of the basis functions of the 8×8 Hadamard transform. In this figure, (0, 0) for example, is the DC component of the Hadamard transform and is equal to ⅛ multiplied by the sum of each pixel value in the picture data. (1, 0) is the low-frequency coefficient of the Hadamard transform as mentioned above and is equal to ⅛ multiplied by the sum of each pixel value of the picture data in the lower half of 4 rows×8 columns (white part) subtracted from ⅛ multiplied by the sum of pixel value of the picture data in lower half white part of 4 rows×8 columns multiplied by ⅛ which is indicated by the black part.

To compute the Hadamard transform coefficients by taking said factors into consideration, first the sum of the pixel value in the 1×8, 8×1, 2×8, 8×2, 4×8, and 8×4 subblocks should be computed with respect to all 8×8 blocks within the reference frame. Suitable Hadamard transform coefficients can be easily obtained by suitable combinations of additions and subtractions of the subblock values. The same subblock value can be used for other Hadamard transform coefficient computations in the same 8×8 block and for Hadamard transform coefficient computation in the other 8×8 blocks.

Figure 8:
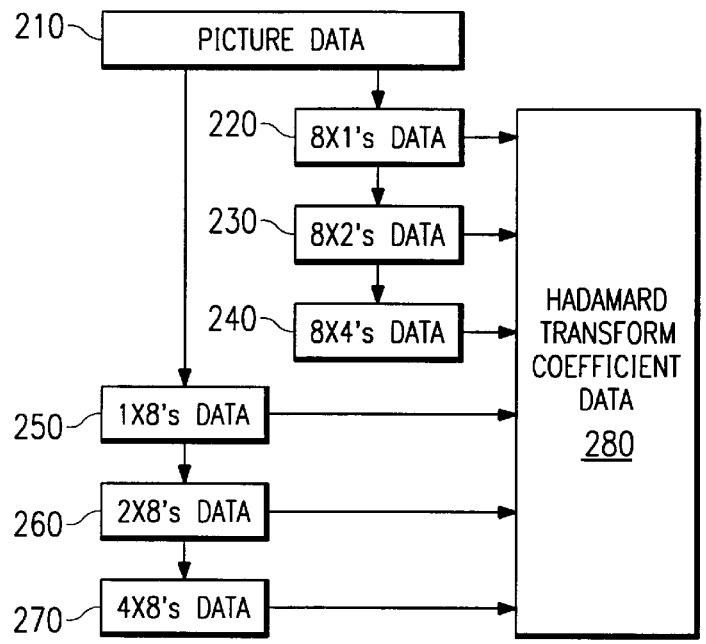
FIG. 8 shows the data flow for computing the Hadamard transform coefficients in this application example.

FIG. 8 shows the data flow in computing the Hadamard transform coefficients by aforementioned method. The sum of pixel values in the 8×1 subblock 220 is obtained for each pixel data 210 in the 8×8 block of the reference frame, the sum of subblock 230 of 8×2 is obtained by utilizing this sum, and the sum of subblock 240 of 8×4 is obtained by utilizing the sum of 8×2. It is the same with regards to subblocks 250, 260, and 270 of 1×8, 2×8, and 4×8. Thus, by adding or subtracting the values of the multiple subblocks, Hadamard transform coefficient data 280 is obtained.

Also, the matching of a 16×16 reference block (divided into 8×8) within the search window with target block (divided into 8×8) is executed, then the reference block is shifted horizontally by one pixel (or a different horizontal or vertical shift, depending on the case) within the search window, and a next matching computation is performed. In this case, if the subblock of 1×8 within the reference block is taken as an example, the values of the previously used 1×8 subblock after it has been shifted horizontally by one column becomes necessary in the next matching. However, if the values of the 1×8 subblock is computed, the values of the next 1×8 subblock in the same row can be obtained by one addition to or one subtraction from the value previously computed (refer to FIG. 9). That is, once $$I(0) = \sum_{i=0}^{7} X(i)$$

is computed, the value I (1) of the next subblock can be obtained by I(0)−X(0)+X(8). This Hadamard coefficient is obtained beforehand as discussed above; therefore, it is not necessary to perform computations for each matching.

Here, the number of computations for the values of all 1×8 subblocks within the frame is obtained,
Equation 10

$$(7+2\times696)\times480=671{,}520$$

Computation regarding the 8×1 subblock is
Equation 11

$$(7+2\times472)\times704=669{,}504$$

The number of computations for the values of the 2×8 subblock obtained from the sum of the values of two 1×8 subblocks and the values of 8×2 subblock obtained from the sum of the values of two 8×1 subblock are as follows, respectively.

Equation 12

$$697\times479=333{,}863$$

Equation 13

$$473\times703=332{,}519$$

The number of computations regarding the value of 4×8 subblock obtained from the total sum of the values of two 2×8 subblocks and the values of 8×4 subblock obtained from the sum of the values of two 8×2 subblock are as follows, respectively.
Equation 14

$$697\times477=332{,}469$$

Equation 15

$$473\times701=331{,}573$$

In order to compute 5 selected Hadamard transform coefficients, 7 additions or subtractions are necessary for each 8×8 block. Namely, (0, 0) element is obtained from an addition of two 8×4 subblocks (or 4×8 subblock), (0, 1) element from subtraction of two 8×4 subblocks, (0, 2) element from an addition and a subtraction of one 8×4 subblock and two 8×2 subblocks, (1, 0) element from a subtraction of two 4×8 subblocks, and (2, 0) element from an addition and a subtraction of one 4×8 subblock and two 2×8 subblocks.

Thus the Hadamard transform coefficient within the reference frame is computed as follows.
Equation 16

$$7\times473\times697=2{,}307{,}767$$

The total is computed as follows.
Equation 17

$$671{,}520+669{,}504+333{,}863+332{,}519+332{,}469+331{,}573+2{,}307{,}767=4{,}979{,}215$$

This is the number of computations for the selected Hadamard transform coefficients (5 low-frequency coefficients) in one frame. Therefore, the number of computations of the Hadamard transform per one motion vector is obtained by the following equation.
Equation 18

$$\frac{4{,}979{,}215}{\frac{480}{16}\times\frac{704}{16}} = 3{,}772.1$$

Next, the number of computations to obtain the coefficient for 16×16 target blocks in the present frame coefficient divided into four 8×8 blocks is obtained. The values of each 1×8 and 8×1 subblocks are computed with seven additions. Therefore, the number of computations for eight 1×8 and 8×1 subblock values within one 8×8 block is obtained as follows.
Equation 19

$$7\times8\times2=112$$

The number of computations [to obtain the coefficient] for four 2 ×8 subblocks obtained by an addition of two 1×8 subblock values and four 8×2 subblocks obtained by an addition of two 8×1 subblock values is obtained as follows.
Equation 20

$$4\times2=8$$

The number of computations with regard to three 4×8 subblocks obtained by an addition of two 2×8 subblock values and three 8×4 subblocks obtained by adding two 8×2 subblock values is obtained as follows.

Equation 21

$$3 \times 2 = 6$$

Computing the Hadamard coefficient selected from said subblock values requires 7 computations.

The number of computations to obtain the coefficient for present block which is divided into four 8×8 blocks is obtained as follows.

Equation 22

$$(112+8+6+7) \times 4 = 532$$

The number of computations for Hadamard transform is obtained as described above.

For the first stage comparisons in the Hadamard transform domain,

Equation 23

$$(5 \times 4) \times 2 \times 32 \times 128 = 163,840$$

(5×4 subtractions and 5×4 additions for each of 32×128 search positions)

For the (−2, +2) neighborhood full search in the second stage,

Equation (24)

$$256 \times 2 \times 5 \times 5 = 12,800$$

(256 subtractions and 256 additions for each of 5×5 search positions)

Therefore, the number of computations for the Hadamard transform-based motion estimation for a motion vector is obtained by Equation 18+Equation 22, +Equation 23+Equation 24.

Equation 25

$$3772.1 + 532 + 163,840 + 12,800 = 180,944.1$$

On the other hand, the number of computations for a full search with respect to the same search window is as follows.

Equation 16

$$256 \times 2 \times 32 \times 128 = 2,097,152$$

Thus, the speed-up factor is obtained as follows.

Equation 17

$$\frac{2,097,152}{180,944.1} = 11.59$$

As shown in Equation 25, most of the number of computations are needed for matching in the Hadamard transform domain in the first stage, which determines the upper limit of the speed-up factor. In this case, for instance, the upper limit of the speed-up factor is 12.8 (=256/20). In fact, the speed-up factor decreases slightly from 12.8 to 11.6 due to the overhead computation of the Hadamard transform and the neighborhood full search.

Here, attention should be paid to the fact that the 3771.1+532=4304.1 as the number of computations is necessary for the selected Hadamard transform coefficients for one motion vector (Equations 18 and 22). There are 32×128=4096 search positions for one motion vector. This means that the number of computations needed for Hadamard transform for one search position is only 4304.1/4096=1.05. This is much smaller than the number of computations required of one block-by-block comparison, which is (5×4)×2=40 (Equation 23).

Simulation results

Simulation was performed using a total of 14 frames, two frames in each of seven MPEG test sequences, by compensating each frame with the previous frame. Simulation conditions were simplification of the MPEG standards.

Estimation mode: frame mode
Picture size: 480×704
Block size: 16×16
Search range: (−16,+15) in vertical direction, (−64,+63) in horizontal direction (1) Pixel accuracy (integer search)

Simulation was performed for series coefficient patterns of 3 cases of the in the first stage, considering an interlaced structure of the video sequences. An interlaced structure generates high energy at a coefficient of (7,0) (refer to FIG. 7). The three series of cases tested are shown below (refer to FIG. 10).

(a) Symmetries-12, 20, 28, 36, 44:

The same number of (0, v) and (u, 0) elements are used so as to be symmetrical about the diagonal line. The numerical value indicates the number of Hadamard transform coefficients used per 16×16 block in the first stage. For example, "12" means that three coefficients were used in each 8×8 target block, and similarly, "20" means that 5 coefficients were used.

(b) Asymmetries-16, 24, 32, 40 48:

One more (u, 0) element is used in the 8×8 Hadamard transform coefficient matrix.

(c) Symmetry+(7, 0)−16, +(7,0)−24,+(7, 0)−32, +(7, 0)−40, +(7, 0)−48

(7, 0) elements are used in each of the Hadamard transform coefficient matrices, as well as the same number of (0, v) and (u, 0) low frequency elements. In other words, (7, 0) was added to the symmetry in aforementioned (a).

Figures 10A, 10B, 10C:
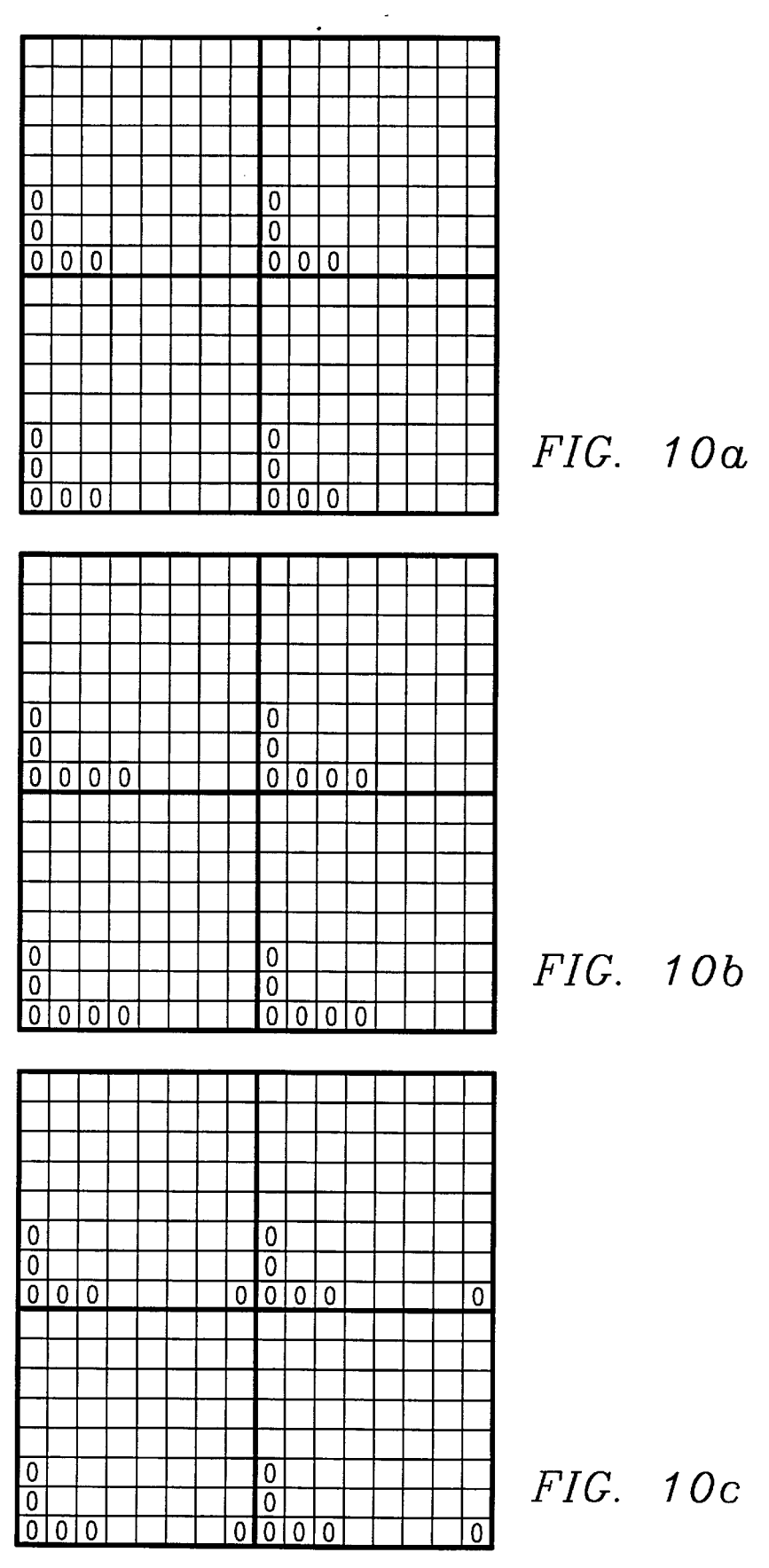

FIG. 10(a) indicates symmetry-20, (b) asymmetry-24, (c) symmetry+(7, 0)−24, and "0" indicates coefficients which are used.

Figure 11:
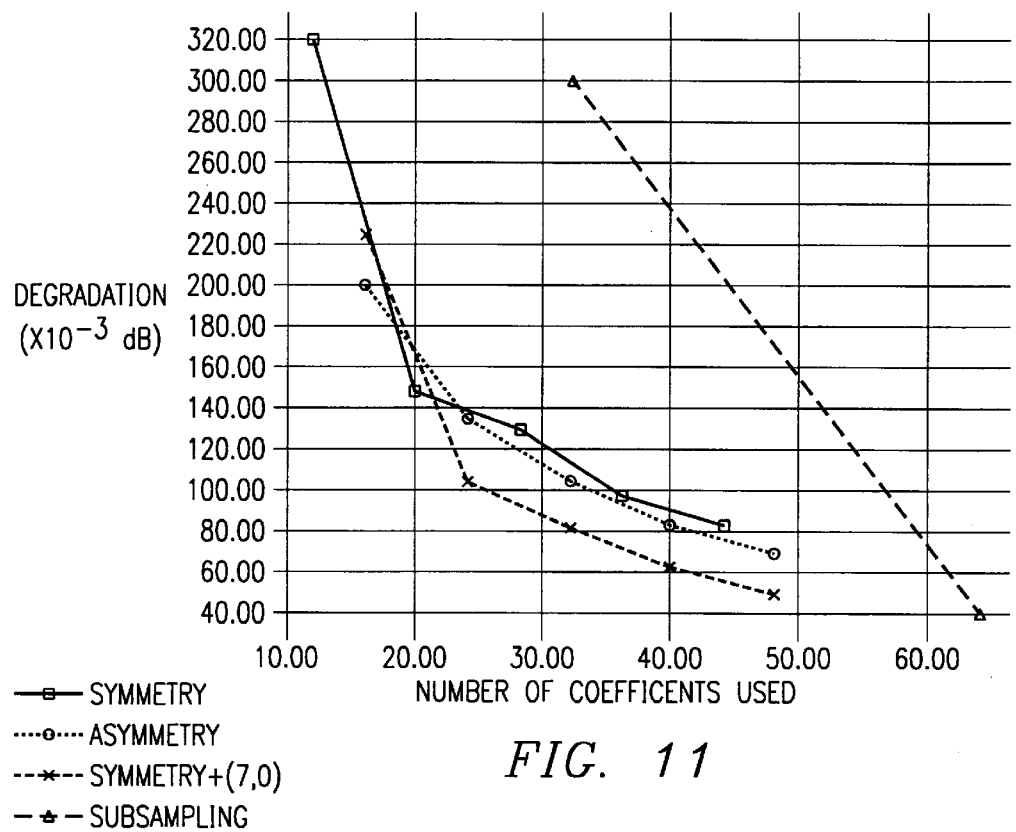
FIG. 11 shows the relationship between search accuracy degradation and the number of Hadamard transform coefficients used.

FIG. 11 shows the relationship between the search accuracy degradation and the number of the Hadamard transform coefficients used on the dB scale. Here, motion compensation was performed for 14 frames: frames #132 and #133 of "FOOTBALL," and frames #2 and #3 of "BICYCLE," "CAR," "CHEERLEADERS," "FLOWER GARDEN," "MOBILE & CALENDAR," and "TABLE TENNIS."

The search accuracy is measured by the sum of square errors between the pixels in the compensated frame and the original frame in all fourteen frames, then compared with the full search. This sum of square error measurement is a rough but simple and encoder-independent measurement. The full search corresponds to 0.0 dB–256 (not shown in FIG. 11). The cases of ¼ and ⅛ pixel subsampling method followed by the (−2,+2) neighborhood full search that is, the matching in the Hadamard domain in the first step is replaced with one which is based on pixel subsampling are shown in FIG. 11 for comparison. These correspond to 64 and 32 respectively, in the horizontal axis. It is apparent that the Hadamard transform-based motion estimation achieves much better search accuracy with a fewer number of computations than the pixel subsampling method.

In this application example, a simulation with another computation reduction method, called Adaptive Indexing technique was performed. With this technique every 2 or 4

Figure 12:
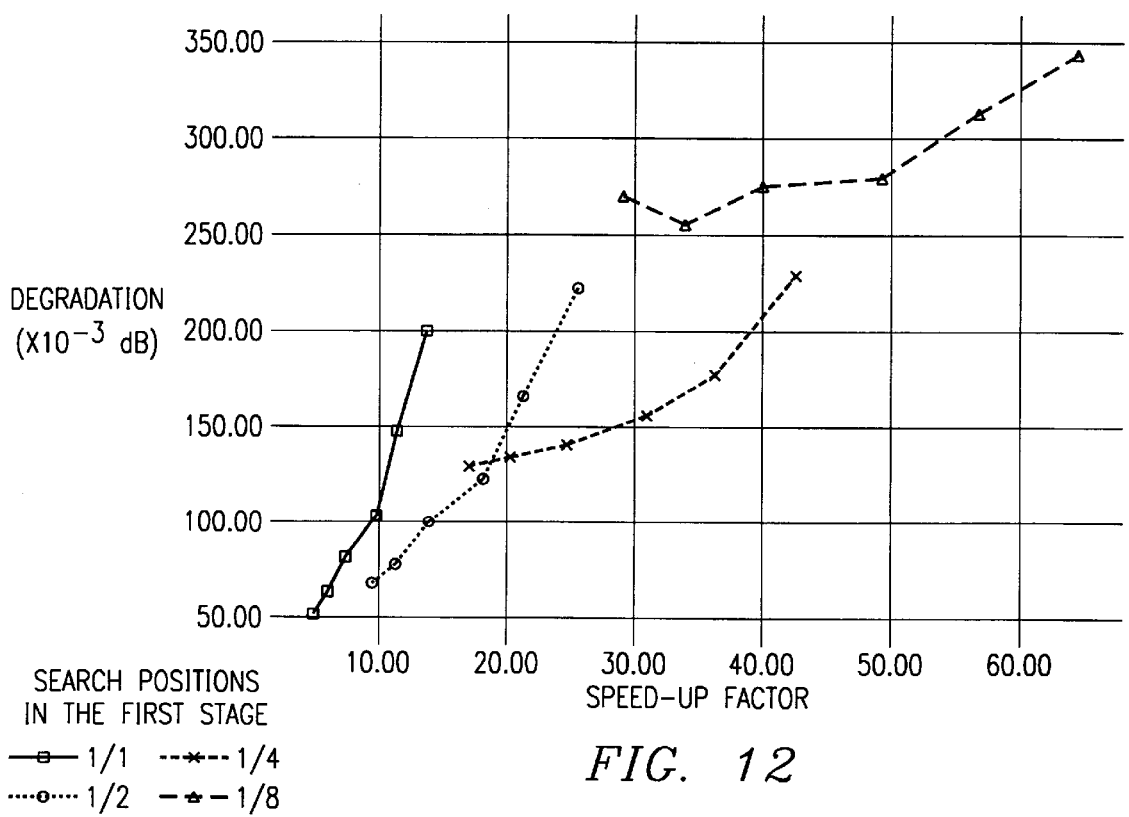
FIG. 12 shows the relationship between the search accuracy degradation and the speed-up factor for the combination of Hadamard transform-based motion estimation and the Adaptive Indexing technique.

(or more) positions in a search range are searched in the first stage, making reference to the motion vectors of the surrounding blocks. In other words, motion field in the first stage are sub-sampled. By referring to motion vectors obtained in the surrounded blocks to determine which sub-sampling lattice should be selected in the first stage, the probability that the global minimum position is searched in the first stage becomes greater. Thus, the search accuracy is kept at a level close to the one in the case in which all positions in a search range are searched in the first stage. The neighborhood full search in the second stage is applied as the same method as in the case of Hadamard transform-based motion estimation only. Simulation shows a relatively high level of search accuracy in the case of the Hadamard transform-based motion estimation only. Simulation was performed in the six cases of the coefficient patterns, asymmetry-16, symmetry-20, symmetry+(7, 0)–24, 32, 40, 48. FIG. 12 shows the simulation results in the cases of ½, ¼, and ⅛ search positions in the first stage. The results for the case where all the positions were searched in the first stage (1/1) are also shown. The combination algorithm of Hadamard transform-based motion estimation and the Adaptive Indexing technique achieves a search accuracy close to that for a full search, but reduces computational complexity by several orders of a magnitude. An example would be 0.12 dB degradation at ⅟₁₈ computation and 0.18 dB at ⅟₃₆.

In this embodiment, picture data 1 from the immediately preceding frame was used as the reference frame, but the invention is not limited to this method and it is possible to use the preceding field and following frame or field as the reference frame or reference field.

Also, according to this application example, [this invention] can be used also for MPEG-1 and MPEG-2 (block sizes of 16×16 pixels or 8×16 pixels are used as the processing unit).

In this invention, the Hadamard transform-based motion estimation is proposed as a solution with respect to a high-speed block-matching algorithm. The motion estimation algorithm of this invention has the advantages of high speed, regularity, simplicity, and superior accuracy. The combination of the Hadamard transform-based motion estimation and the Adaptive Indexing technique can reduce a computation complexity by several orders of magnitude with little degradation in the search accuracy. In fact, the speed-up factor is almost inversely proportional to the achieved accuracy. Also, the algorithm of this invention is suitable for systolic array architecture because of its regularity and simplicity. By realizing this algorithm in hardware, it is expected that a low-cost, high-quality video encoder will become a practical technology in the near future.

We claim:

1. A data processing device comprising:
   (a) Hadamard transformation means for receiving first and second image data and for transforming said first and second image data by Hadamard transformation;
   (b) first processing means coupled to said Hadamard transformation means and receiving said first and second Hadamard transformed data each corresponding to said first and second image data, for comparing said first and second Hadamard transformed data to select an estimated position in the second image data corresponding to a target block in the first image data;
   (c) second processing means coupled to said first processing means to receive the estimated position and receiving said first and second image data, to determine a motion vector for said target block by performing a fill search in the vicinity of the estimated position in the second image data; and
   (d) coding means for coding differences between said first image data and second image data compensated by said motion vector.

2. The data processing device of claim 1 wherein said first processing means compares a search window from said second Hadamard transformed data to a target block of said first Hadamard transformed data by using only a selected few coefficients of said second Hadamard transformed data.

3. The data processing device of claim 2 wherein said second processing means defines a search region within said second image data using the estimated position result of said first processing means and determines the motion vector for said target block within said search region, and wherein said second processing means provides said motion vector to said coding means.

4. The data processing device of claim 2 wherein said first image data are image data of a predetermine size block constituting a current frame or field, said second image data are image data constituting a reference frame or field, and wherein said first processing means performs the matching of target block of Hadamard transformed data with the second Hadamard transformed data to estimate the motion for the target block.

5. The data processing device of claim 1 wherein said second processing means defines a search region within said second image data using the estimated position result of said first processing means and determines the motion vector for said target block within said search region, and wherein said second processing means provides said motion vector to said coding means.

6. The data processing device of claim 1 wherein said first image data are image data of a predetermine size block constituting a current frame or field, said second image data are image data constituting a reference frame or field, and wherein said first processing means performs the matching of the target block of Hadamard transformed data with the second Hadamard transformed data to estimate the motion for the target block.

7. A data processing device comprising:
   (a) Hadamard transformer receiving first and second image data and generating first and second image data transformed by Hadamard transformation;
   (b) a first processor coupled to said Hadamard transformer and comparing said first and second transformed data to estimate a motion for said first transformed image data relative to said second transformed image data;
   (c) a second processor coupled to said first processor and receiving said first and second image data, and for comparing said first image data and a portion of said second image data indicated by the estimation result of said first processor to determine a motion vector for said first image data; and
   (d) a coder for coding differences between said first image data and second image data compensated by said motion vector.

8. The data processing device of claim 7 wherein said second processor defines a search region within said second image data using the estimation result of said first processor and determines the motion vector for said first image data relative to said search region, and wherein said second processor provides said motion vector to said coder.

9. The data processing device of claim 7 wherein said first processor compares said first Hadamard transformed data with a selected few coefficients of said second Hadamard transformed data.

10. The data processing device of claim 7 wherein said first image data are image data of a predetermined size block constituting the current frame or field, and wherein said second image data are image data constituting a reference frame or field, and wherein said first processor performs the comparing of first and second blocks each corresponding to said first and second Hadamard transformed data to estimate the motion for the first block.

* * * * *